United States Patent [19]

Sudo

[11] Patent Number: 4,614,474
[45] Date of Patent: Sep. 30, 1986

[54] DEVICE FOR EXCHANGING DISKS

[75] Inventor: Yoshihiro Sudo, Kanagawa, Japan

[73] Assignee: Sony Corporation, Tokyo, Japan

[21] Appl. No.: 643,532

[22] Filed: Aug. 23, 1984

[30] Foreign Application Priority Data

Aug. 31, 1983 [JP] Japan ............................ 58-159723
Sep. 1, 1983 [JP] Japan ............................ 58-159729

[51] Int. Cl.⁴ .............................................. B65G 1/02
[52] U.S. Cl. .................................... 414/281; 414/280;
414/331; 414/416; 414/274; 414/618; 414/751;
360/98; 369/178; 369/191; 369/192; 369/194
[58] Field of Search ............... 414/277, 280, 282, 286,
414/331, 416, 273, 274, 749–753, 618; 360/92,
96.5, 98; 369/75.2, 178, 191, 192, 194

[56] References Cited

U.S. PATENT DOCUMENTS 3,389,814  6/1968  Lemelson ............................ 414/274
3,478,254  11/1969  Lofrisco et al. .................. 414/274 X

FOREIGN PATENT DOCUMENTS 2210818  9/1973  Fed. Rep. of Germany ...... 369/194

Primary Examiner—Frank E. Werner
Attorney, Agent, or Firm—Hill, Van Santen, Steadman & Simpson

[57] ABSTRACT

A device for exchanging disks is provided with a pair of opposing disk containers each containing a large number of disk caddies each having side grooves and an upper surface having a recess adapted for containing a disk, a unit for extracting disks interposed between the opposing disk containers and adapted for extracting disk caddies from these disk containers, and a unit for vertically shifting the disk extracting unit. The latter is movable between the disk containers from a first position to a second position and vice versa, and is provided with a pair of hook members cooperable with one of the disk containers and another pair of hook members cooperable with the other disk container. These hook members are actuated by electromagnetic devices thereby and engageable in the side grooves of the disk caddy. When the extracting unit is moved to the first position, one pair of the hook members are at a position capable of engaging in the side grooves of a disk caddy contained in one of the disk containers, the other pair of the hook members are engaged in the side grooves of a selected one of the disks contained in the caddy extracted from the other disk container and the center aperture of the selected disk is at the mid position between the disk containers. When the extracting unit is moved to the second position, the other pair of the hook members are at a position capable of engaging in the side grooves of the disk caddy contained in the other disk container, one of the pairs of the hook members are engaged in the side grooves of a selected disk caddy which is extracted from one disk container, and the center aperture of the selected disk is at the mid position between the disk containers. When one or the other pair of the hook members are engaged by the electromagnetic devices in the side grooves of the disk caddy contained in one or the other disk container, and the center aperture of the disk in the disk caddy is at the mid position between the disk containers, the unit for vertically shifting the disk extracting unit is actuated for vertically shifting the disk caddy.

12 Claims, 18 Drawing Figures

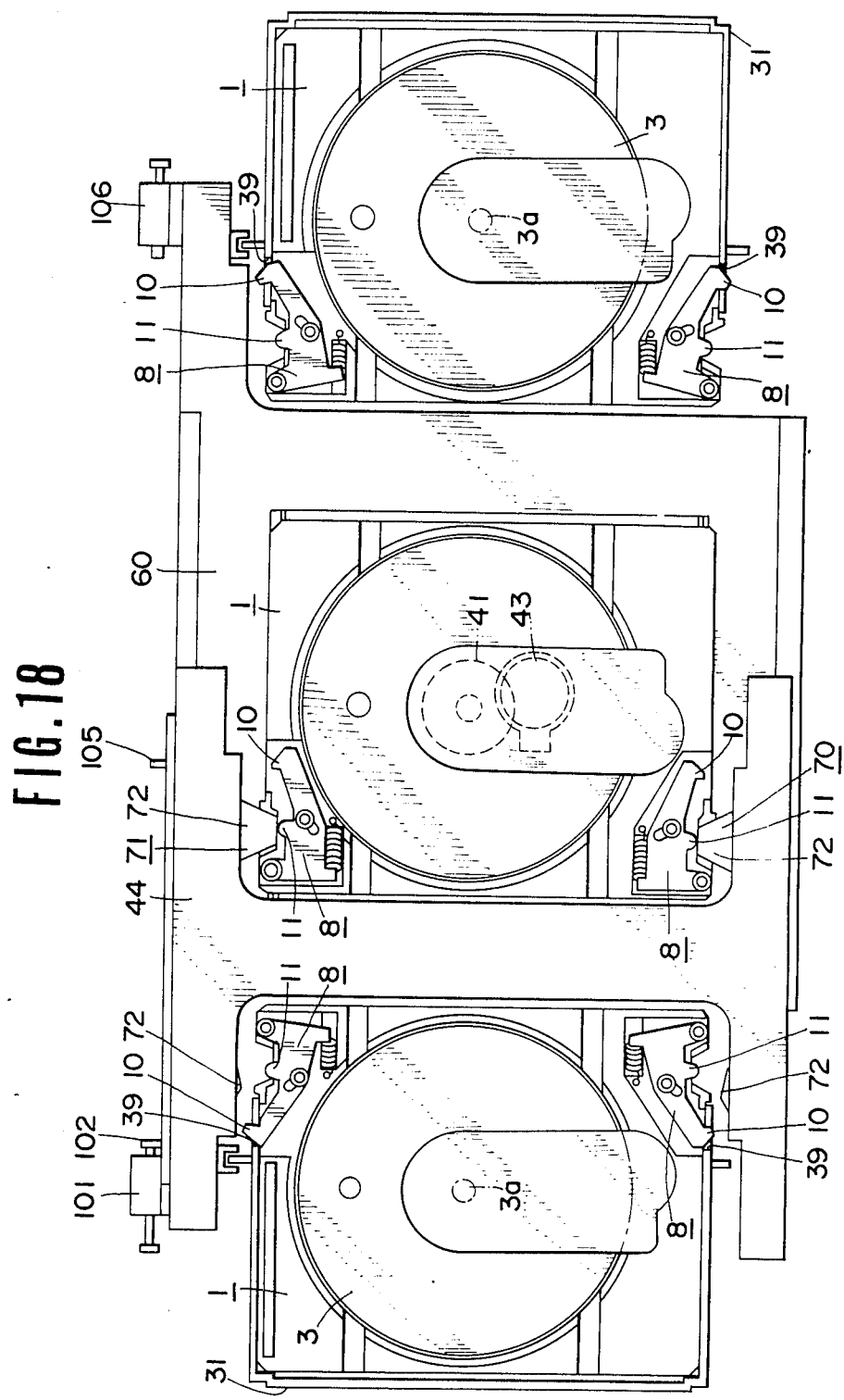

1

DEVICE FOR EXCHANGING DISKS

BACKGROUND OF THE INVENTION

This invention relates to a device for exchanging disks according to which a selected one of disk caddies placed in tiers in the disk container is extracted therefrom and the disk contained in the disk caddy is placed in the playing section for playing.

Devices are known in which a selected one of disks such as phonographic disks placed in tiers in a disk container are taken out and played automatically. In these automatic playing devices, it is known to hold the disks to be played in separate disk caddies which are extractably placed in tiers in a casing-like disk container. These disk caddies may be selectively extracted from the disk container by a special disk extracting unit and placed on the disk table of the playing section by the disk transfer unit.

In these automatic playing devices, it is preferred that a larger number of disks be disposed in advance in the disk container to permit variegated performance on the disks. It is also preferred that the size of the overall device be reduced so that the device may be installed within a limited space as desired.

BRIEF SUMMARY OF THE INVENTION

Object of the Invention

It is an object of the present invention to provide a disk exchanging device which permits the automatic disk playing device to be reduced in size.

It is another object of the present invention to provide a disk exchanging device capable of selectively extracting disks by a disk extracting unit from one or the other of the disk containers on both sides of the disk extracting unit with as small a travel stroke of the disk extracting unit as possible.

It is a further object of the present invention to provide a disk exchanging device capable of securely holding disks such as optical disks in a disk container of the automatic disk playing device, and also capable of selectively extracting the disks from the container for playing.

It is a further object of the present invention to provide a disk exchanging device in which mechanical contact with the disk of the disk extracting unit adapted for extracting the disk from the disk container is completely eliminated for assuring positive protection of the disk.

It is a further object of the present invention to provide a disk exchanging device in which the disk caddy contained and held in the disk container by rocking arms can be extracted without mechanical contact with the disk contained in the caddy.

It is still another object of the present invention to provide a disk exchanging device in which movement of the disk extracting unit is controlled by the minimum number of sensing means.

Other objects, features and advantages of the invention will become more apparent from the following description of the preferred embodiment thereof especially when read in conjunction with the accompanying drawings.

BRIEF DESCRIPTION OF THE DRAWINGS

FIG. 18 is a plan view showing a disk caddy extracted from a second disk container.

DETAILED DESCRIPTION OF THE INVENTION

Referring to the accompanying drawings, a preferred embodiment of the present invention will be explained in detail.

Figure 1:
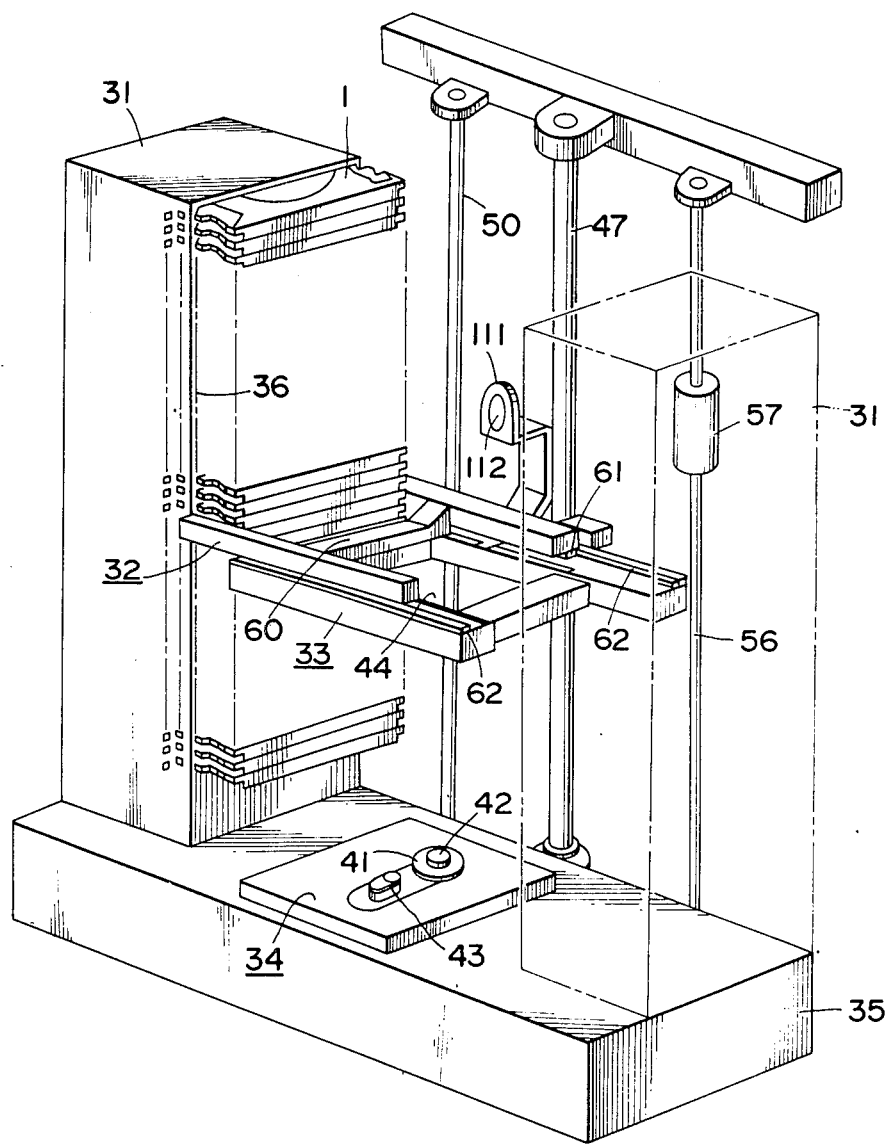
FIG. 1 is a schematic perspective view showing an automatic playing device for an optical disk of which the disk extracting unit of the present invention is a part.
Figure 2:
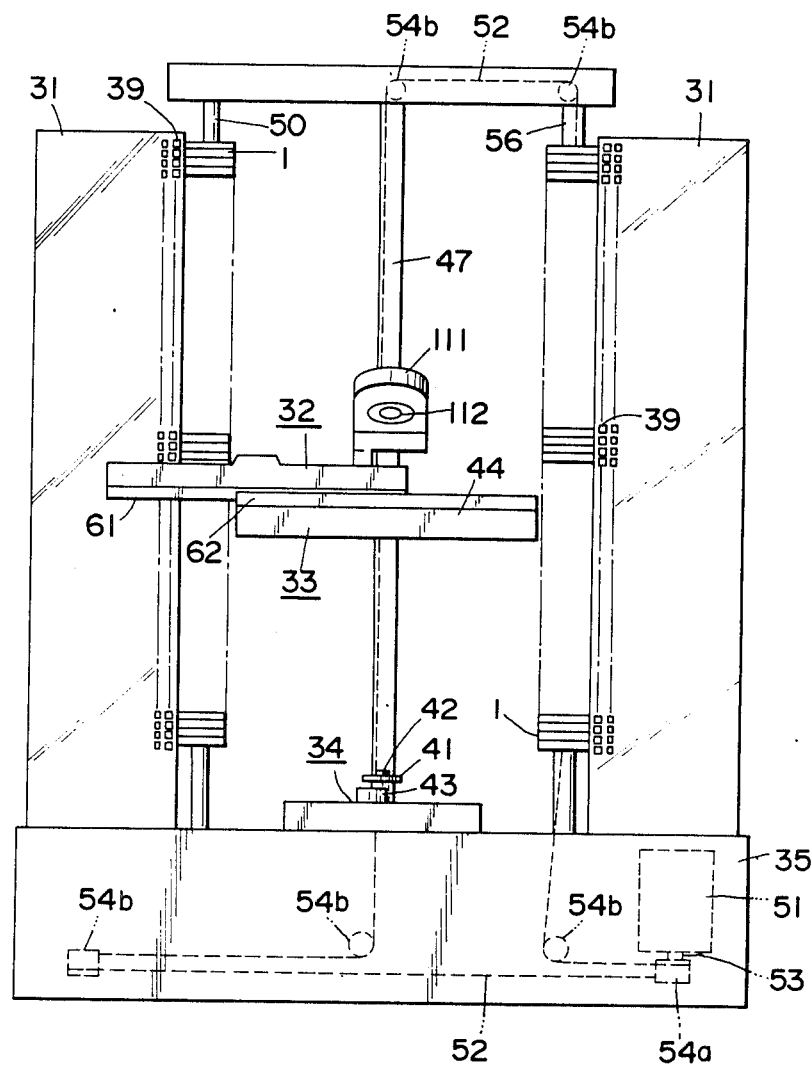
FIG. 2 is a schematic front view of the automatic playing device.
Figure 3:
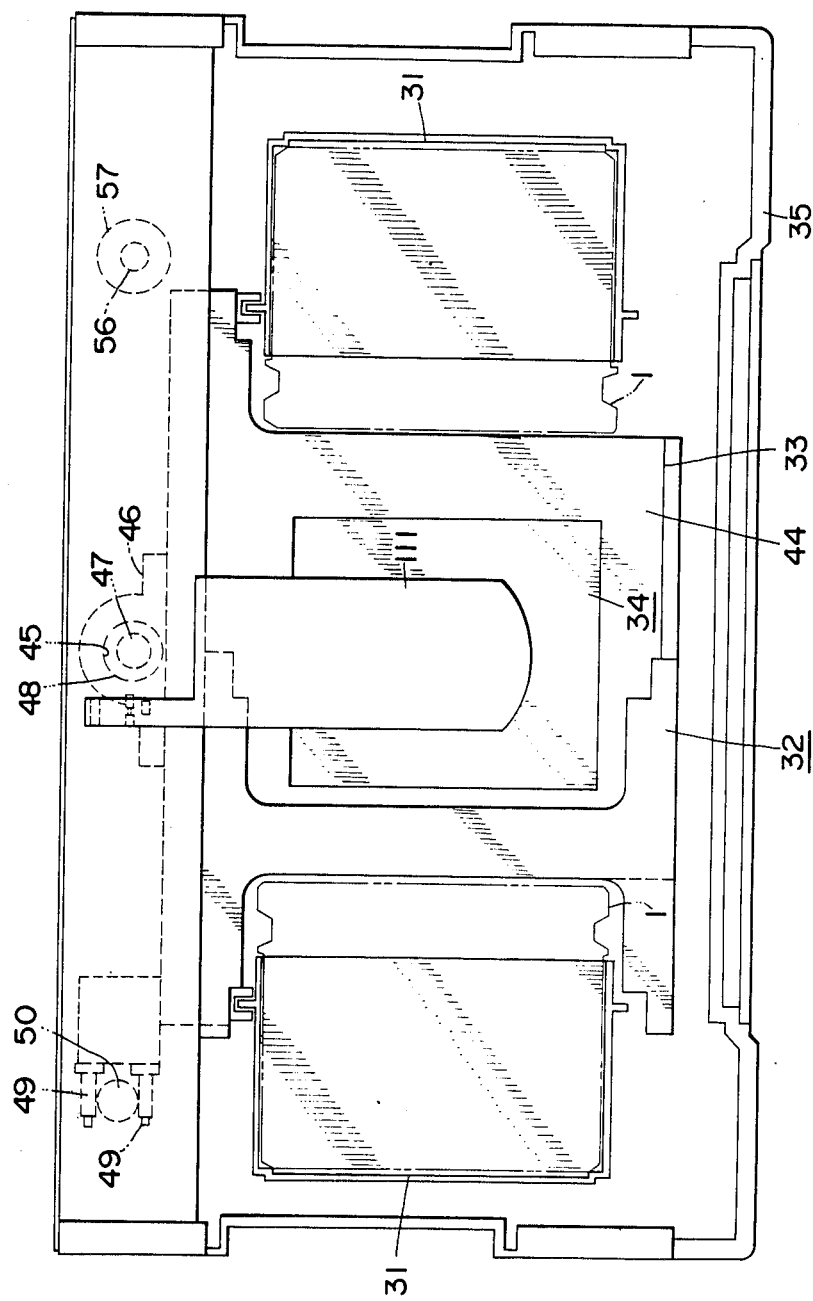
FIG. 3 is a schematic plan view of the automatic playing device.

In the present embodiment, a disk exchange device of the present invention is applied to an automatic playing or performance device with a built-in optical disk player. As shown in FIGS. 1, 2 and 3, the automatic performance device includes a pair of disk containers 31, 31 in which a large number of disk caddies 1 are placed in tiers, a disk extracting unit 32 for selectively extracting and handling disk caddies 1 contained in these disk containers 31, 31, a disk transfer unit 33 for transferring the disk caddies 1 extracted by the disk extracting unit 32 to a predetermined playing position together with the extracting unit 32, and a playing section 34 for playing the disk 3 contained in the caddy 1 and transferred by the disk transfer unit 33.

Figure 4:
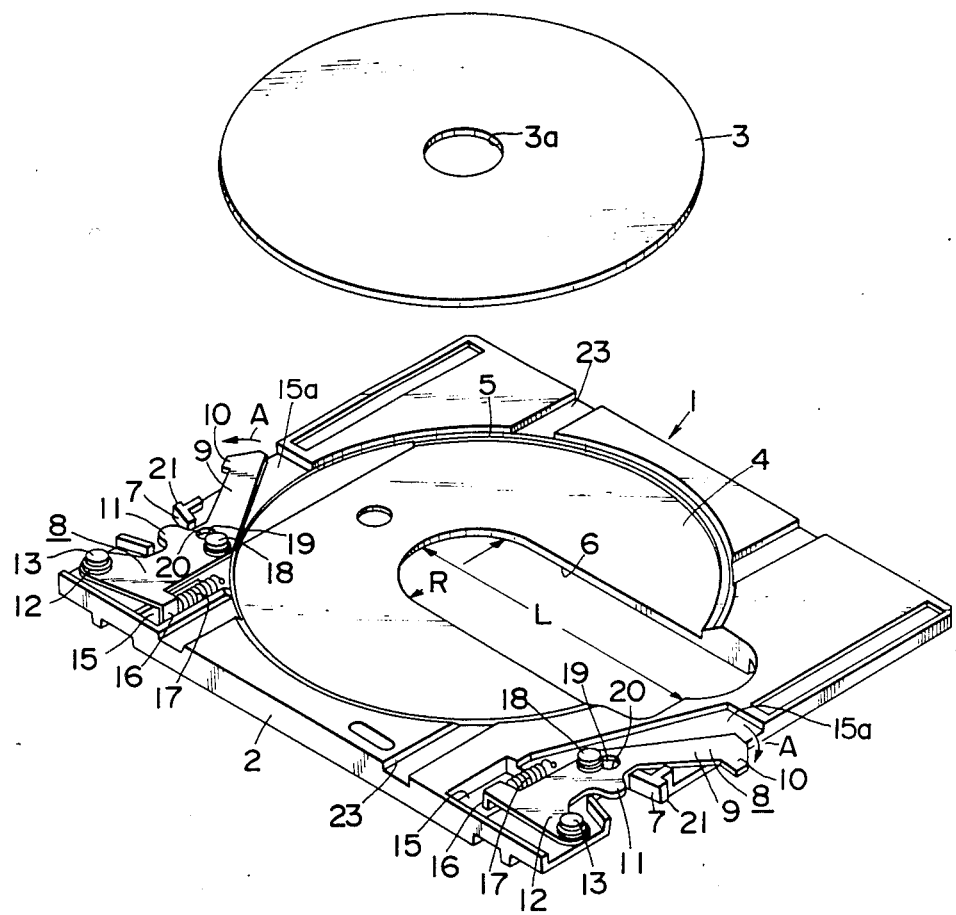
FIG. 4 is a perspective view of a disk caddy employed in the present device.
Figure 5:
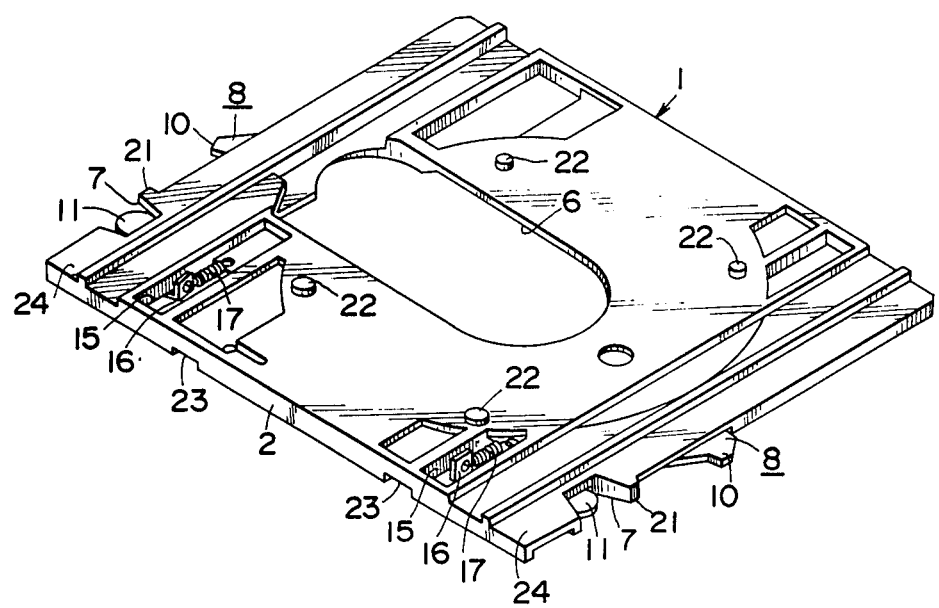
FIG. 5 is a perspective view showing the bottom side of the disk caddy.
Figure 6:
FIG. 6 is a cross-sectional view of the disk caddy.

In the above described automatic playing device, the disk caddy 1 containing and holding the optical disk 3 to be played is constructed and arranged as shown in FIGS. 4, 5 and 6. The disk caddy 1 has a body member 2 in the form of a square flat plate, the upper surface of which is formed with an arcuate recess 4 for containing an optical disk 3 on which are recorded a predetermined information such as signals of musical sound in a known manner. To this effect, the recess 4 has a profile corresponding to the outer profile of the disk 3. The recess 4 has a depth at least larger than the thickness of the disk 3, in such a manner that, when the disk 3 is housed within the recess 4, the disk 3 is not projected above the upper surface of the body member 2. The outer periphery of the recess 4 is formed with an annular step 5 at an elevation higher than the bottom of the recess, as shown in FIG. 6, in such a manner that the optical disk 3 contained in the recess 4 has its unrecorded peripheral zone resting on the annular step 5. Thus the optical disk 3 is contained in the recess without having its recorded surface contacted with the bottom surface of the recess 4. An opening 6 is formed in the body member 2 for extending from the center to a side of the main body member and confronting to the objective lens side of an optical pickup unit. In this opening or oblong slot 6, there is projected a disk table on which the optical disk 3 contained in the disk caddy 1 and transferred therewith to the playing section is designed to rest for playing. The optical pickup unit is adapted to travel on the lower surface of the disk 3 between its inner periphery and outer periphery for reading the information recorded on the disk 3. Since the disk table intrudes into the opening 6, and the opening is confronted by the objective lens side of the optical pickup unit, the slit has a width R larger than the diameter of the disk table on which the optical disk 3 rests and a length L at least equal to the travel stroke of the objective lens of the pickup unit.

The forward end of the lateral edges of the body member 2 are formed with recesses 7, 7 in which are engaged hook members adapted for holding the disk caddy 1 as later described. Each recess 7 is substantially vee shaped with a narrow inner portion and a width increasing gradually from the narrow inner portion towards the outer portion. Rocking arms 8, 8 are mounted to the body member 2 in the neighborhood of the recesses 7, 7. These rocking arms are engaged and held by a disk container when the disk caddy 1 is in the container. Each rocking arm 8 has an arm section 9 substantially in the form of an angle and having a first projection or rocking pawl 10 at one end and a second projection or an operating knob 11 with a semicircular end at approximately the center of the arm section 9. The rocking arm 8 is pivotally mounted by having the foremost part of the rocking pawl 10 projecting laterally outwardly of the recess 7, the operating knob 11 projecting into the recess 7 and also by having an upright supporting shaft 13 on the forward corner of the body member 2 passed through a corresponding through-hole in a projection 12 at the other end of the arm section 9. A tubular spring 17 is retained at one end by a stationary portion of the body member 2 and at the other by a downwardly bent side portion 16 of the rocking arm 8 so that the rocking pawl 10 is urged to rotate in the direction of the arrow mark A so as to be projected laterally outwardly from the body member 2. The bent portion 16 of the rocking arm 8 is housed within a cut-out 15 in the body member 2. Midway in the arm section 9 of the rocking arm 8, there is bored an elongated through-hole 20 having a curved surface 19 corresponding to the rotational trajectory of the rocking arm 8 and in which an upright guide post 18 on the main body 2 is engaged, in such a fashion that the rocking arm 8 of a longer length may perform a controlled rotary movement with the guide post 18 engaging with the curved surface 19 as a guide and a pivoting movement of the rocking arm 8 is inhibited. The rocking arm 8 is mounted for rotation within a cut-out or step 15a in the body member 2 in such a fashion that the rocking arm 8 is not projected above the upper surface of the caddy 2 when mounted in the cut-out 15a. Since the bent portion 16 acting as a retainer for spring 17 is disposed within the cut-out 15, the tubular spring 17 is accommodated within the cut-out without projecting from the upper surface or the lower surface of the body member 2. In this manner, the disk caddy 1 can be reduced in thickness because the rotating rocking arm 8 and the spring 17 biasing the arm 8 into partial rotation are housed within the thickness of the main body 2 thus providing for higher caddy density in the disk container and enabling smooth extraction and housing of the disk caddies.

The inner opening ends of the recesses 7, 7 of the body member 2 are formed with stationary stoppers 21, 21 adapted for engaging with the open end face of the disk container and controlling the caddy housing position when the disk caddy 1 is housed within the disk container. The supporting shafts 13, 13 carrying the rocking arms 8, 8 are mounted to projecting side lugs of the body member 2, and the front side of the body member 2 has a width larger than the width of the back side of the body member 2 which is the inserting side into the disk container. This prevents the situation in which the caddy is introduced into the disk container with the front side first.

On the lower surface of the caddy 2, a plurality of bosses 22 shown in FIG. 5 are formed at positions corresponding to the recess 4 for supporting the disk 3 resting in the subjacent disk caddy from dropping when a number of disk caddies 1 each containing one optical disk 3 are placed in tiers in the disk container. Thus the upper surface of the body member 2 is formed with grooves 23 extending from the front towards the back sides of the caddy 1 and adapted for guiding the bosses 22 when the disk caddies 1 placed in tiers are extracted selectively from the disk container.

The lower lateral sides of the main body 2 are formed with a pair of guide slots 24, 24 having an L-shaped cross-section and adapted for engaging with guide rails when the selected caddy is extracted from the disk container.

Figure 7:
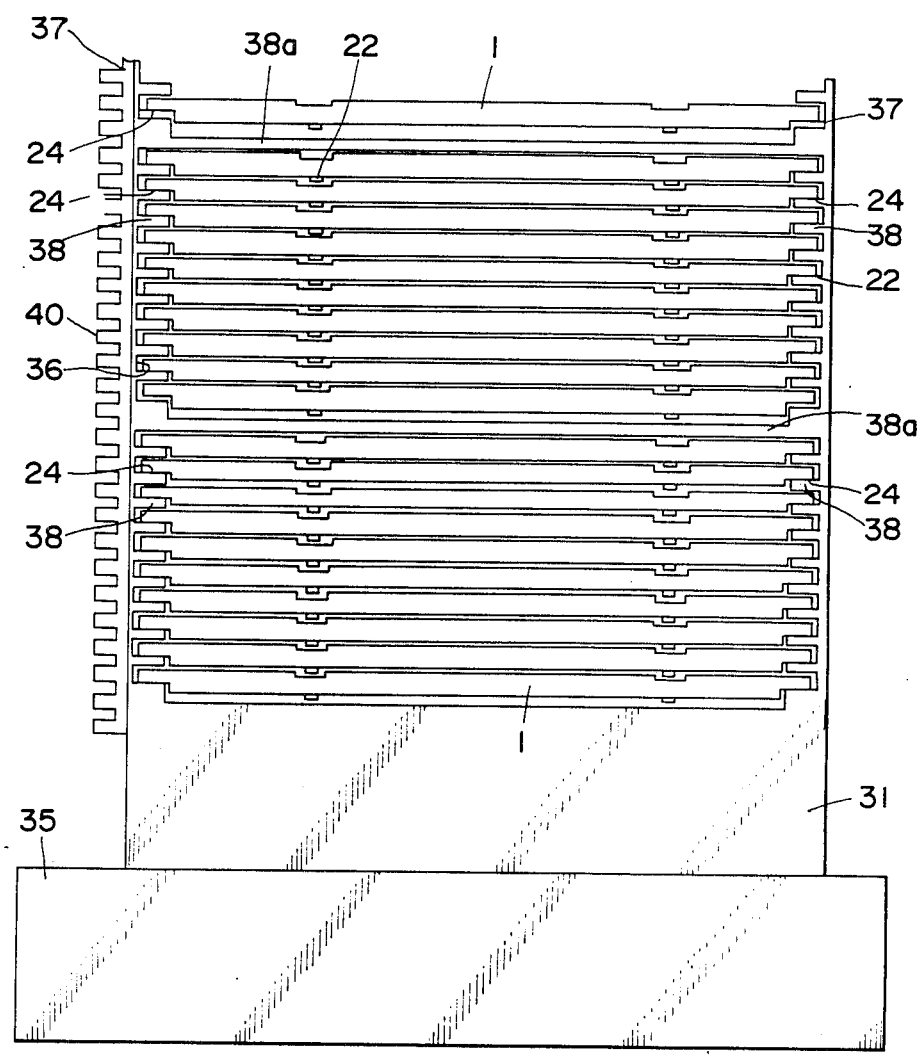
FIG. 7 is a partial front view of the disk container which is a part of the automatic playing device.

The disk containers 31, 31 of the automatic playing device in which the disk caddies 1 are placed in tiers are mounted on both sides of a base block 35 (FIG. 1) of the automatic playing device with open sides 36 facing to each other. Each disk container 31 is in the form of a box with the width of the open side 36 (FIG. 7) corresponding to the width of the caddy 1 contained in the container 31. The inner surfaces of the opposite side walls 37, 37 are formed with a number of lugs 38 superimposed one above the other with spacing between the adjoining lugs sufficient to accommodate the disk caddy 1. The body members 2 of the caddies 1 are placed in the container with the guide slots 24 on either sides of the body members 2 resting on the lugs 38. In the disk container 31 of the present embodiment, sixty pairs of lugs 38, 38 are formed one upon the other for housing sixty disk caddies 1. Each tenth lugs 38, 38 on both edges of the open side 36 are connected together by a reinforcement connecting lug 38a.

Basically, it is only sufficient if the vertical distance between the adjoining lugs 38 is such that one disk caddy is safely accommodated between these lugs. However, in order to increase the housing density of the disk caddies 1 in the container, it is preferred that, when the disk caddies 1 are placed on the lugs in the container 31, the bosses 22 on the lower surface of a given disk caddy 1 are projected only slightly into the recess 4 of the subjacent disk caddy, and a small clearance exists between the lugs and the upper surface of the subjacent disk caddy 1 to facilitate insertion of the disk caddy on the lugs 38 of the disk container.

Figure 8:
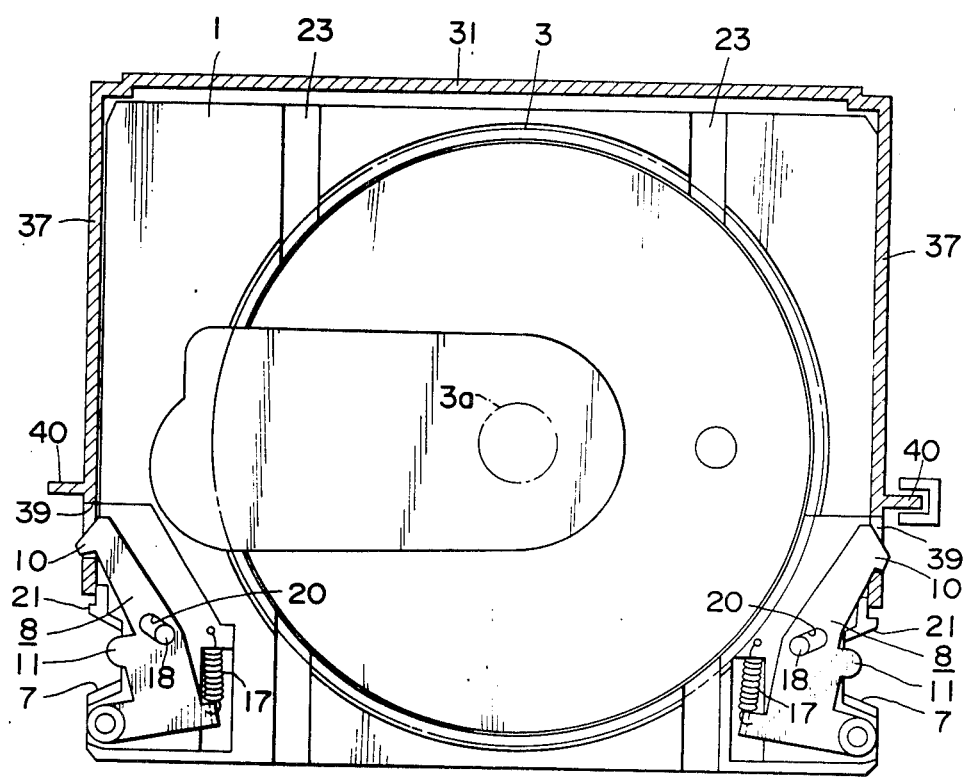
FIG. 8 is a cross-sectional plan view of the disk container.

On the side walls 37, 37 of the disk container 31 are formed engagement openings 39 (FIGS. 2 and 8) at vertical positions corresponding to the spacing between the lugs 38, 38 of the side walls 37, 37 of the disk container 31. In these engagement openings are engaged rocking pawls 10 at the foremost parts of the rocking arm 8 provided to the disk caddy 1 as shown in FIG. 8. On the other side of at least one side wall 37, there are formed lugs 40 (FIGS. 7 and 8) one upon the other and correspondingly to the engagement openings 39. for sensing the caddies 1 contained in the disk container 31.

When the disk caddy 1 is introduced into the disk container 31 through the open sides 36 with the rear side of the disk caddy first and with both guide slots 24, 24 engaging with the lugs 38, the end rocking pawls 10, 10 are pressed by the side walls 37, 37 of the disk container 31 against the force of the springs 17, 17. Thus the rocking arms 8, 8 are turned and intruded as a whole into the body member 2. When the disk caddy 1 is introduced until the stoppers 21, 21 provided to the front side of the caddy 1 abut on the side edges of the open side 36 of the disk container 31, the terminal rocking pawls 10, 10 of the rocking arms 8, 8 face to the engagement openings 39, 39 formed in the side walls 37, 37. Thus, as shown in FIG. 8, the rocking arms 8, 8 are caused to turn under the force of the springs 17, 17 so that the rocking pawls 10, 10 are engaged in the openings 39, 39. Since the disk caddies 1 are contained in the container with the terminal rocking pawls 10, 10 of the rocking arms 8, 8 engaged in the openings 39, 39, the caddy 1 may be contained positively and protected against accidental dropping from the container 31.

When the caddy 1 is contained in the disk container 31 with the rocking pawls 10, 10 engaged in the openings 39, 39 as mentioned hereinabove, the operating knobs 11, 11 of the rocking arms 8, 8 projecting into the recesses 7, 7 are disposed, together with the recesses 7, 7, to the outside of the disk container 31. Thus, when the operating knobs 11, 11 are pressed suitably, the rocking arms 8, 8 are turned against the force of the springs 17, 17 for disengaging the rocking pawls 10, 10 from the openings 39, 39. Therefore, the disk caddy 1 can be extracted from the disk container 31 by pressing the operating knobs 11, 11 for causing the rocking arms 8, 8 to be rotated and disengaging the rocking pawls 10, 10 from the openings 39, 39.

When the automatic playing device is provided with a pair of disk containers 31, 31 in which the disk caddies 1 arranged and constructed in the manner described are stacked in tiers, the playing section 34 (FIG. 1) provided with the optical pickup unit 43 is mounted on the base block 35 with the axis of a spindle 42 disposed at the mid position between the disk containers 31, 31. The disk table 41 is mounted integrally to the spindle 42. The automatic playing device is further provided with caddy holding means adapted for holding the caddies 1 contained in the disk containers 31, 31. The disk extracting unit 32 acting for extracting the disk caddies 1 thus held by said caddy holding means from the disk containers 31 are supported for sliding between the disk containers 31, 31 by the transfer unit 33, which in turn is mounted for vertical movement in a space between the disk containers 31, 31.

The transfer unit 33 has a carrier 44 substantially in the form of a frame with a center opening. A supporting block 46 (FIG. 3) having an axial throughhole 45 is mounted to one rear side of the carrier 44. An upright vertical guide shaft 47 provided to the rear side of the base block 35 is passed through the throughhole 45 of the supporting block 46 by the intermediary of a slide bearing 48. A pair of clamping pieces 49, 49 provided to one rear side of the carrier are adapted to hold a control shaft 50 therebetween for inhibiting rotation of the carrier about the guide shaft 47. The carrier 44 mounted in this manner is driven vertically by a vertical driving motor 51 (FIG. 2) provided to the upper back side of the base block 35. The driving force developed by the motor 51 is transmitted through a wire 52 to the carrier 44. The drive transmitting wire 52 is connected at both ends to the carrier 44 and placed around a pulley 54a mounted to the driving shaft 53 of the motor 51 for transmitting the driving force of the driving motor 51 to the carrier 44. The wire 52 is also wound about pullies 54b provided to a proper position within the playing device so that the wire has a travel passage parallel to a vertical guide shaft 47 and a travel passage normal to the driving shaft 53 of the motor 51. A balance weight 57 (FIG. 1) slidably fitted to a slide shaft 56 extending parallel to the guide shaft 47 is connected to a mid point of the wire 52 so that the carrier 44 can be stopped at a suitable position on the vertical guide shaft 47. In this manner, the carrier 44 of the transfer unit 33 is adapted to be vertically guided by the vertical guide shaft 47 and driven by the vertical driving motor 51. By the driving operation of the driving motor 51, the carrier 44 is moved vertically between a position corresponding to the upper end of the disk container 31 and a position corresponding to the lower surface of the disk table 41 of the playing section 34 mounted on the base block 35, and operates in such a manner that the optical disk 3 contained in the disk caddy 1 extracted by the extracting unit 32 can be placed on the disk table 41.

Figure 9:
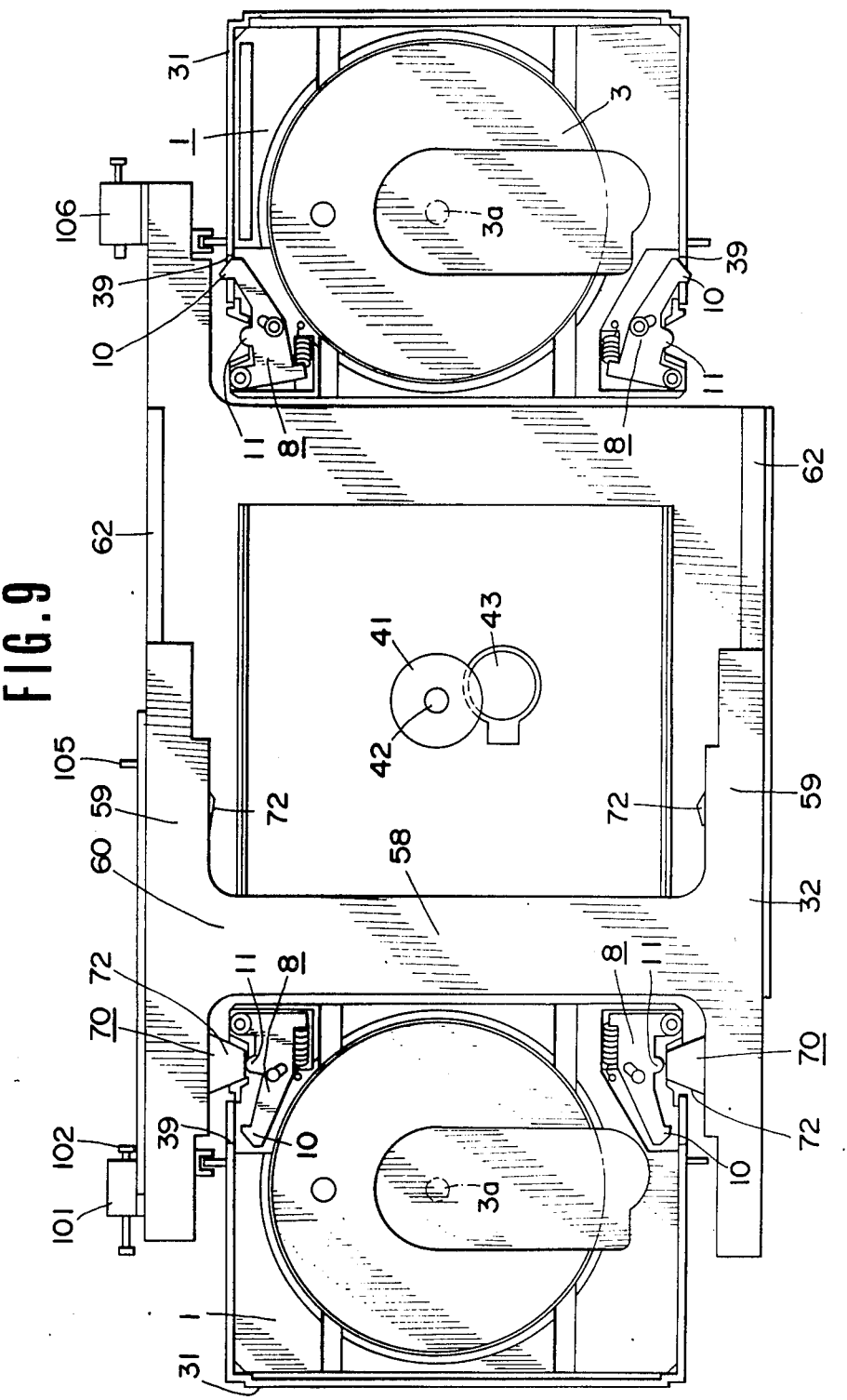
FIG. 9 is a plan view of the automatic playing device showing the disk extracting unit of the present invention.
Figure 10:
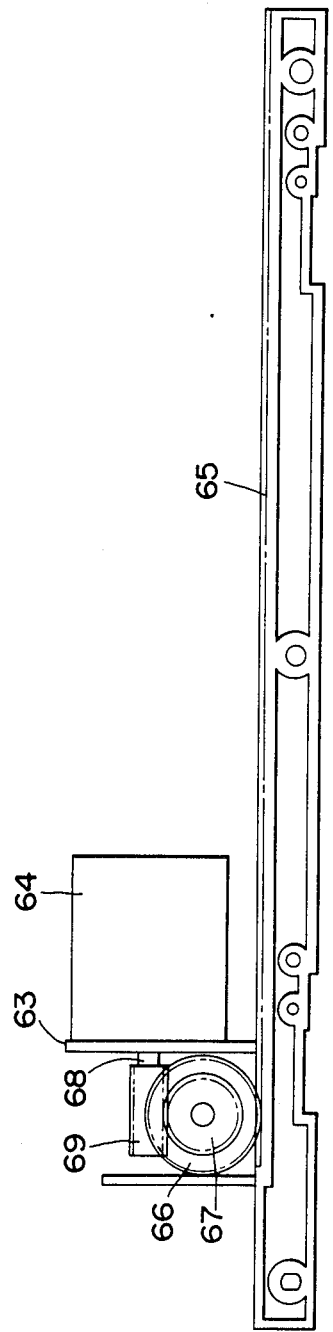
FIG. 10 is a side elevation showing a slider driving system of the disk extracting unit of the present invention.

Referring to FIG. 9, the disk extracting unit 32 slidably supported on the carrier 44 of the transfer unit 33 has a slider 60 in the form of a letter H with a connecting web 58 and a pair of supporting rods 59, 59 extending parallel to each other. The slider 60 (FIGS. 1, 2 and 15) is mounted on the carrier in such a manner that a pair of supporting rails 61, 61 attached to opposite lower sides of the rods 59, 59 and having longitudinally extending vee grooves are placed in opposition to a pair of guide rails 62, 62 mounted to the opposite sides of the carrier 44 and having similarly longitudinally extending vee grooves, with cross-bearings 62a interposed between the supporting rails 61, 61 and the guide rails 62, 62. The slider 60 is slidable in this manner horizontally between the disk containers 31, 31. The slider 60 slidable in this manner on the carrier 44 is driven by a slider driving motor 64 (FIG. 10) attached to the rear side of the carrier 44 with a metallic fitting 63. The slider 60 and the driving motor 64 are connected to each other in such a fashion that a toothed rack 65 attached to a side of one of the supporting rods 59 of the slider 60 meshes with a spur gear 66 coaxially mounted to a helical gear 67 meshing in turn with a worm gear 69 which is mounted to a driving shaft 68 of the slider driving motor 64. The slider 60 is reciprocated in this manner by rotational driving of the slider driving motor 64.

Figure 11:
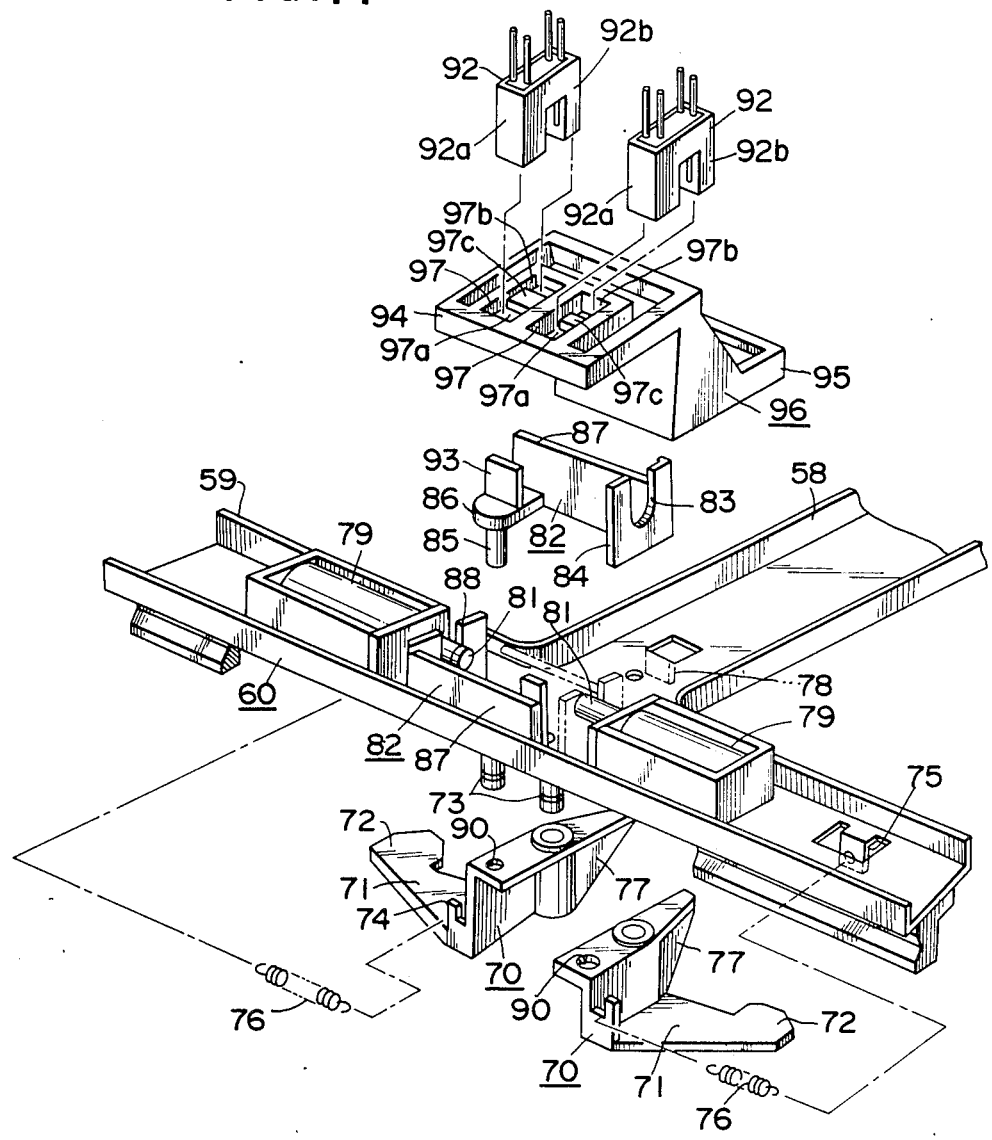
FIG. 11 is an exploded perspective view of the slider.
Figure 12:
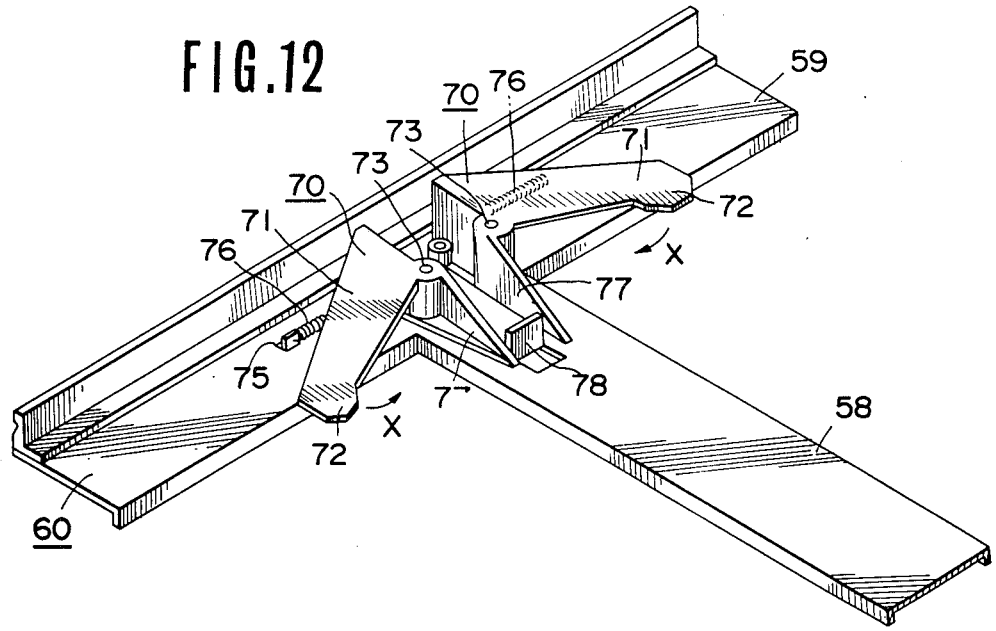
FIG. 12 is a bottom perspective view of the slider.

The slider 60 of the extracting unit 32 slidable on the carrier 44 by the slider driving motor 64 has a pair of hook members 70 in opposition to each of the disk containers 31, 31, these hook members making up holding means for holding the disk caddies 1 contained in the disk containers 31, 31. As shown in FIG. 11, each hook member 70 of the disk caddy holding means has an arm section 71 formed with an engagement end pawl 72 adapted for engaging in an associated one of the recesses 7 provided on either sides of the caddy 1. To this effect, the pawl 72 has a profile complementary to that of the recess 7. The pawl 72 is substantially vee shaped with a wider base and gradually tapered towards a narrower foremost part. The two pairs of hook members 70, 70 are mounted in such a manner that the hook members are rotatably journaled by means of supporting shafts 73 attached to the lower surface of the slider 60 at the connecting part between the supporting rods and the connecting web 58 with the engagement pawls 72, 72 symmetrical about the axis of the connecting web 58. The hook members 70 are biased to rotate towards each other, i.e. in a direction shown by the arrow mark X in FIG. 12, by means of springs 76 retained at one ends by lugs 74 formed at the base ends of the arm sections 71 and at the other by depending portions 75 formed integrally with the slider 60. The arm section 71 of the hook member 70 is contiguous to an upright positioning portion 77. With the hook members 70 mounted to the slider 60 and biased to be turned in the above described manner, the positioning portions 77 abut on a pair of retaining pieces 78, 78 formed integrally with the slider 60 on the center axis of the connecting web 58, for defining limit positions of the hook members 70. With the hook members 70, 70 are in this limit position, the distance between the engagement pawls 72 on one and the other supporting rods 58, 58 is approximately equal to the distance between the recesses 7 on either sides of the disk caddy 1. Thus, with the engagement pawls 72, 72 engaged in the recesses 7, 7, the hook members 70, 70 are engaged in the recesses 7, 7 of the disk caddy 1 without being biased by the springs 76 so that the hook members are able to hold the caddy 1 without stressing the caddy.

The hook members 70 are respectively associated with solenoid plungers 79 mounted on the upper surface of the slider 60 by means of upright mounting pieces formed integrally with the supporting rods 59. These solenoid plungers 79 operate for turning the hook members 70 against the force of the springs 76 for separating the engagement pawls 72 of the paired hook members 70 from each other. The solenoid plunger 79 associated with one hook member of a pair 70 and the solenoid plunger 79 associated with the other hook member 70 of the pair are mounted with their plunger rods 81 facing to each other. The solenoid plunger 79 and the hook member 70 are connected to one another by an L-shaped connecting plate 82 shown in FIG. 11. The connecting plate 82 is comprized of a short section 84 having an upper recess for engagement with plunger rod 81 and a long section 87 having an extension 86 on the end of the long section 87 opposite to the short section 84, said extension 86 having a pin 85 projecting down for engaging with the associated hook member 70. The plunger rod 81 is engaged at its engaging groove 88 with the recess 83, while the pin 85 is projected from the lower surface of the slider 60 through an elongated through-hole 89 formed in the slider 60 to be engaged in a mating through-hole 90 formed in the proximate end of the arm section 71. In this manner, the solenoid plunger 79 and the hook member 70 are connected together by the connecting plate 82, as shown in FIG. 11. When the current is supplied to the solenoid plungers 79 for rectracting the plunger rods 81, the hook members 70 are caused to rotate against the force of springs 76 so that the confronting engagement pawls 72, 72 of the paired hook members 70, 70 are separated from each other for releasing the disk caddy 1 from the paired hook members 70, 70.

Figure 13:
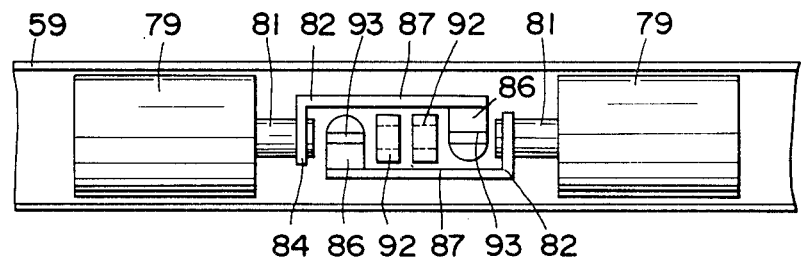
FIG. 13 is a plan view showing an operation sensing means for the hook members.

It should be noted that the solenoid plungers 79, 79 adapted for operating the hook member pair 70, 70 are mounted in opposition to each other, while the hook members 70, 70 are mounted to close to each other, the connecting plates 82, 82 are mounted with the respective long sections 87 facing to each other, as shown in FIG. 13, thus enabling the rotational operating system of the hook members 70 to be accommodated in a compact space.

Means for sensing whether or not the hook members 70 are in the operative state as a result of actuation of the solenoid plungers 79 is provided on top of the slider 60. This sensing means is comprized of a photoelectric interrupter 92 having a light receiving element and a light emitting element, and a shutter plate 93 adapted for invading into a space between the light receiving and emitting elements of the interrupter 92. The shutter plate 93 is provided to the extension 86 of the movable connecting plate 82 in opposition to the pin 85. Two interrupters 92, 92 of the same construction are mounted to a holder 96 having its proximate end 95 securely mounted to the connecting web 58 of the slider 60 in such a fashion that a mounting section 94 for the interrupter overlies the connecting plates 82. The mounting section 94 of the holder 96 has engaging sections 97, 97 adapted for engaging with two interrupters 92, 92. These engaging sections 97, 97 are provided with apertures 97a, 97b adapted for receiving mounting legs 92a for the light emitting elements and a mounting legs 92b for the light receiving elements, respectively. The interrupters 92 are mounted to the holder 96 with the mounting legs 92a, 92b received in the apertures 97a, 97b and the web portions of the letter U resting on supporting flat portions 97c. The two interrupters 92, 92 thus mounted are adapted to be positioned between the shutter plates 93, 93 of the connecting plates 82 mounted in a facing relation to each other as shown in FIG. 13. The arrangement is such that, when one of the connecting plates 82 is actuated, the light receiving element of one of the interrupters 92 associated therewith senses such activation of the connecting plate and the resulting partial rotation of the hook member 70 connected to the plate 82 based on the interruption of the light from the light emitting element by the shutter plate 93 connected to said connecting plate 82, and that, when the other connecting plate 82 is actuated, the light receiving element of the other interrupter 92 associated therewith senses such actuation of the connecting plate and the resulting partial rotation of the associated hook member 70 based on the interruption of the light from the light emitting element by the shutter plate 93 connected to said other connecting plate 82.

Figure 14:
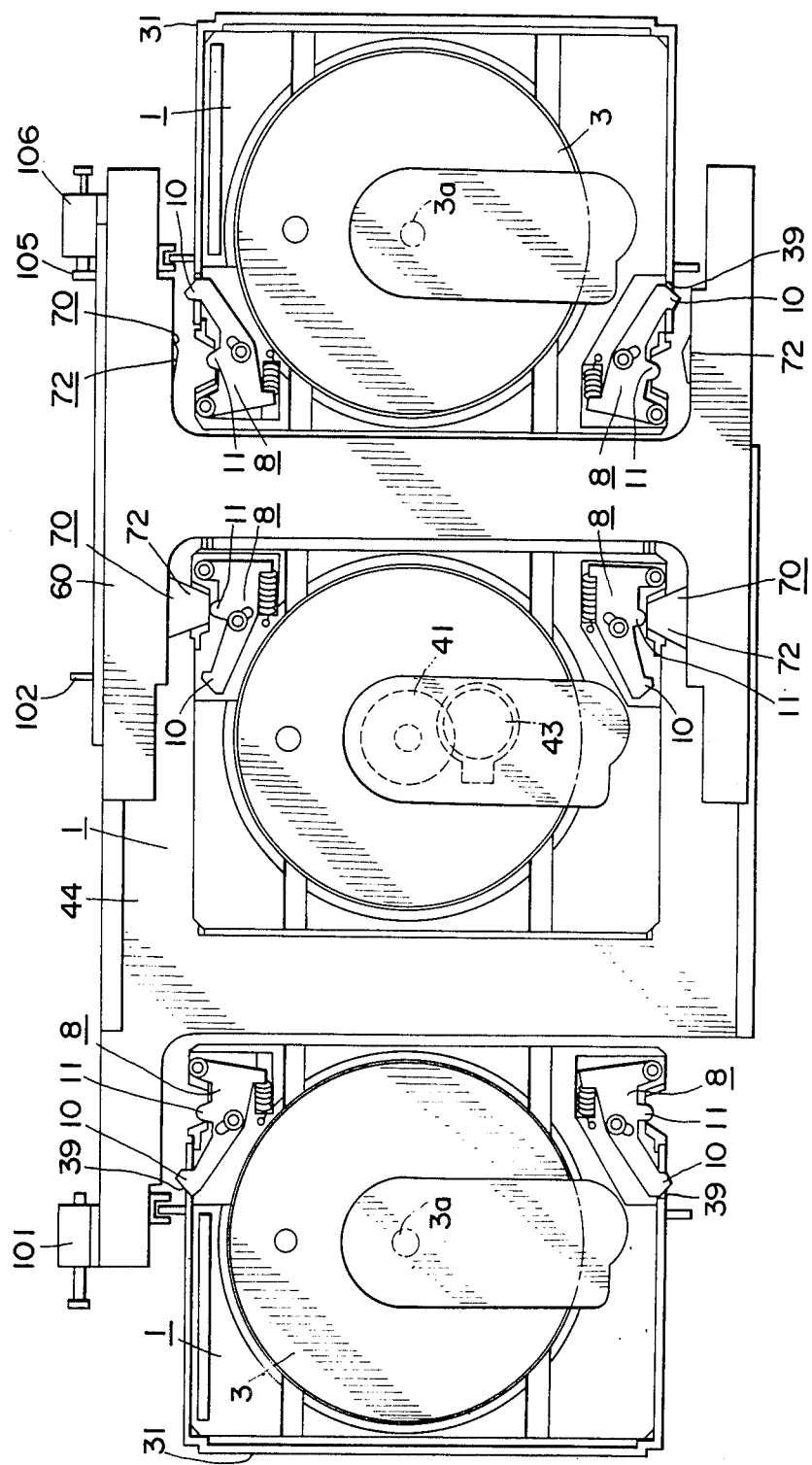
FIG. 14 is a plan view showing a disk caddy extracted from one of the disk containers.

The sequence of operations from the extraction of the disk caddy 1 contained in the disk container 31 by the disk extracting unit 32 which is provided with hook members 70 acting as disk caddy holding means until performance on the optical disk 3 contained in the thus extracted disk caddy 1, is explained. It is now supposed that one of the disk containers 31, 31, for example, the left-hand side container in FIG. 9, and a disk caddy 1 contained in the disk container and bearing a certain address, are specified. The four solenoid plungers 79 adapted for partially rotating the associated hook members 70 are energized so that the pairs of hook members 70 are rotated partially away from each other. The driving motor 51 is then activated for elevating the carrier 44 with the guide shaft 47 as guide and until the slider 60 supported on the carrier 44 reaches the position corresponding to the disk caddy 1 bearing the specified address. The slider driving motor 64 is driven forward for shifting the slider 60 towards the designated left-hand side disk container 31. As the slider 60 is shifted until the engagement pawls 72, 72 of the leading hook members 70, 70 provided to the slider 60 reach the recesses 7, 7 of the disk caddy 1, a first switch 101 provided to the carrier 44 for sensing the slider position is activated by a first operating piece 102 provided to the left-hand side of one of the supporting rods 59 of the slider 60, when viewed in FIG. 9, for outputting a signal indicating that the slider 60 has reached a first position towards the left-hand side disk container 31, thereby stopping the operation of the driving motor 64. The slider 60 is stopped at a position in which the leading side hook members 70, 70 are facing to the recesses 7, 7 of the designated disk caddy 1. The solenoid plungers 79, 79 associated with the leading side hook members 70, 70 towards the left-hand side of the slider 60 are deenergized so that the engagement pawls 72, 72 of the hook members are engaged in recesses 7, 7 of the disk caddy 1. With the hook members 70, 70 thus holding the disk caddy 1, the slider driving motor 64 is driven in reverse and the slider is driven towards the other disk container 31 or towards right in FIG. 9 for extracting the disk caddy 1 out of the left-hand side disk container 31. When extracted in this manner, the disk caddy 1 has its side grooves 24, 24 engaged in the guide rails 103, 103 (FIG. 15) provided on the carrier 44 so that the caddy 1 is caused to slide on the carrier 40 together with the slider 60 with these guide rails as guide. The slider 60 is shifted in this manner to a second position which coincides with a center position between the disk containers 31, 31 and in which the center aperture 3a of the optical disk 3 contained in the extracted disk caddy 1 is in register with the axis of the spindle 42 of the playing section, as shown in FIG. 14. When the slider 60 is shifted to the second position, a second operating piece 105 provided to the right-hand side of one of the supporting rods 59 of the slider 60 when seen in FIG. 9 activates a second switch 106 provided to the carrier 44 for sensing the slider position, so that a signal is supplied by the second switch 106, whereby the operation of the slider driving motor ceases and the slider 60 is stopped at the second position as indicated in FIG. 14.

When the slider 60 has reached the second position, the right-hand side hook members 70, 70 when seen in FIG. 9 are brought to close to the right-hand side disk container 31 with the engagement pawls 72, 72 of the hook members 70, 70 facing to recesses 7, 7 of disk caddies 1 contained in the right-hand side disk container 31.

With the disk caddy 1 held by the hook members 70, 70 and extracted by the slider 60, the vertical driving motor 51 is driven forward for lowering the carrier 44 to a position below the playing section 34.

Figure 15:
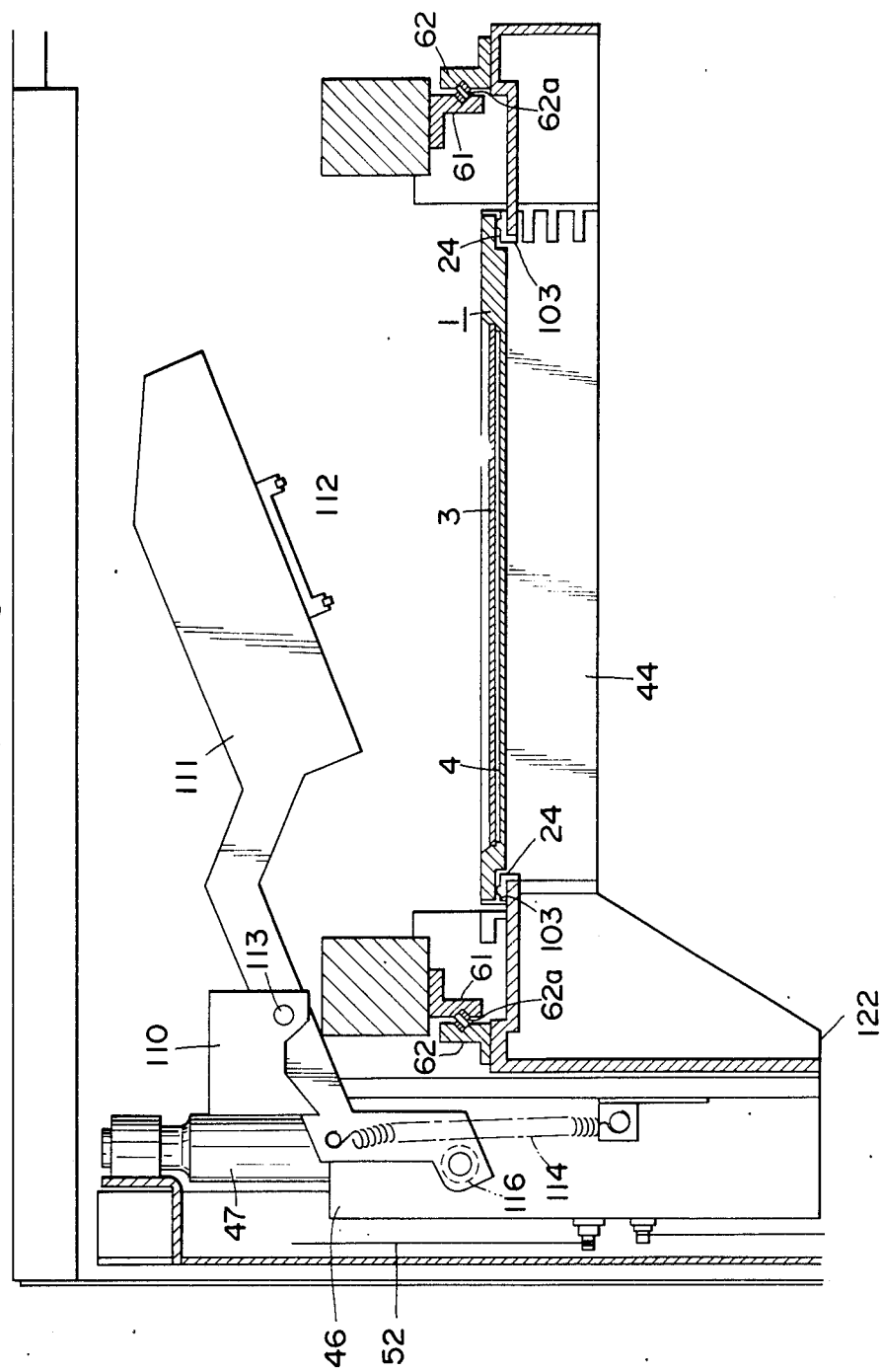
FIG. 15 is a side elevation showing a chuck arm provided to a carrier.
Figure 16:
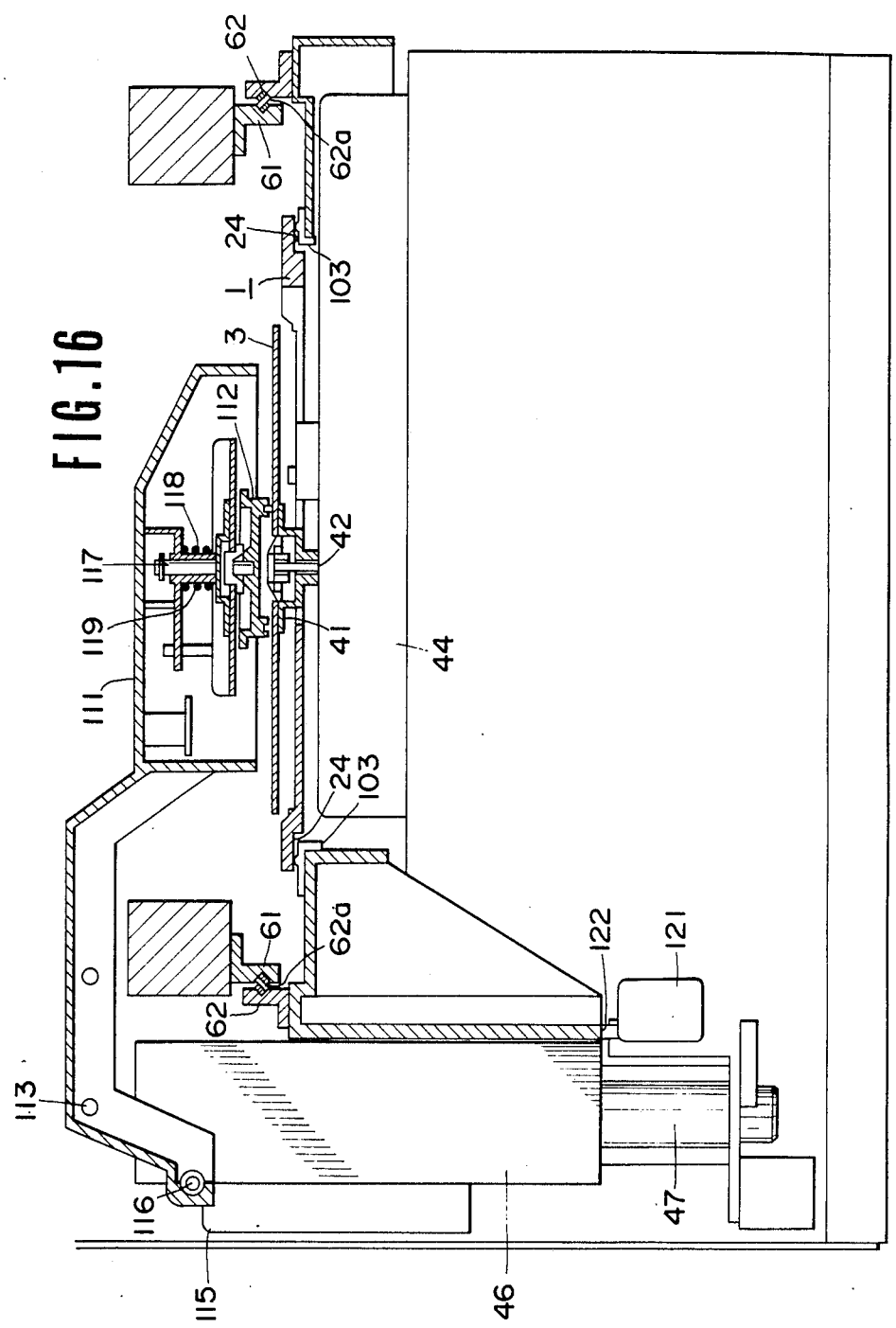
FIG. 16 is a cross-sectional view showing a disk clamped on a turntable.

Referring to FIG. 15, a metal fixture 110 is attached to a supporting block 46 supporting the carrier 44 on the vertical guide shaft 47, as shown in FIG. 15, and a chuck arm 111 is mounted to the supporting block by the metal fitting 110. The chuck arm 111 is carried by a pivot shaft 113 in such a fashion that a disk chuck 112 mounted to the distal end of the chuck arm faces to the slider 60 placed on the carrier 44. The chuck arm 111 is biased to rotate away from the slider 60 by a tension coil spring 114 the one end of which is retained by the supporting block 46 and the other end of which is retained by the proximate end of the chuck arm at back of the pivot shaft 113. In this manner, the chuck arm 111 is positioned so as not interfere with the caddy extracting movement of the slider 60. The proximate end of the chuck arm 111 is provided with a pressure roll 116 adapted for engaging with a pressure cam 115 mounted on the base block 35 when the carrier 44 is lowered to the level of the playing section 34.

When the carrier 44 with the slider 60 and the disk caddy 1 thereby extracted is lowered and reaches a position above the playing section 34, the disk table 41 is introduced into the long slit 6 of the disk caddy 1 resting on the guide rails 103, 103 of the carrier 44, until the disk contained in the disk caddy 1 is placed on the disk table 41, with the spindle 42 engaging in the center aperture 3a. When the carrier 44 is further lowered from this state, the disk caddy 1 is moved to a position below the disk table 41 and separated from the disk 3 which is left resting on the disk table 41. When the carrier 44 is lowered to a position in which the optical disk 3 rests on the disk table 41, the chuck arm 111 has its pressure roll 116 engaged with the pressure cam 115, so that the chuck arm 111 is caused to rotate towards the disk table 41 against the force of the tension coil spring 41 until the disk chuck 112 is pressed towards the disk table 41 for pressuring the optical disk 3 on the disk table 41 and causing the disk 3 to rotate in unison with the disk table 41. A pressure limiting spring 119 is mounted between a mounting shaft 117 of the disk chuck 112 and a supporting portion 118 slidably carrying the mounting shaft 117 for maintaining the pressure of the disk chuck 112 on the optical disk 3 at a preset value.

When the carrier 44 is lowered to the point that the optical disk 3 is separated from the caddy 1 and clamped on the disk table 41 by the disk chuck 112, a limit switch 121 provided to the base of the vertical guide shaft 47 is activated by a lower pressing portion 122 of the carrier 44 for issuing an output signal indicating the position of the lowered carrier 44. This causes the vertical driving motor 51 to be stopped and the playing section 34 to be in the playing condition. Thus the disk table 41 and hence the disk 3 are caused to rotate and the optical pickup unit 43 mounted in opposition to the optical disk 3 is caused to trace the optical disk between the inner periphery and outer periphery of the disk through the long slit 6 of the disk caddy 1. During this time, the musical sound signals recorded on the disk 3 are read by a laser beam generated by a semiconductor laser enclosed in the unit 43 for sound reproduction or performance.

When the sound reproduction comes to a close, or a switch for stopping the playing section 34 is operated, rotation of the disk table 41 ceases, at the same time that the vertical driving motor 51 is driven in reverse for elevating the carrier 44 and causing the disk 3 so far resting on the disk table 41 to be again received within the arcuate recess 4 of the disk caddy 1. At this time, the pressure roll 116 of the chuck arm 111 is disengaged from the pressure cam 115 so that the chuck arm 111 is turned under the force of the coil spring 114 for separating the disk chuck 112 from the disk table 41 and releasing the disk 3. With the disk 3 thus contained within the disk caddy 1, the carrier 44 is raised further and halted at a height level corresponding to the specified address of the disk container 31 allotted to the disk caddy 1. With the carrier 44 thus halted, the slider driving motor 64 is driven in reverse for shifting the slider 60 to the first position close to the left-hand side container in FIG. 9. Thus the disk caddy 1 so far held by the left-hand side hook members 70, 70 when seen in FIG. 9 are introduced into the disk container 31. When the first operating piece 102 provided to the slider 60 actuates the first switch 101 which thus senses that the slider 60 has reached the first position, the slider driving motor 64 is stopped, at the same time that the solenoid plungers 79, 79 associated with the paired hook members 70, 70 are energized for partially rotating the hook members 70, 70 for disengaging the pawls 72, 72 of the hook members 70, 70 from the recesses 7, 7 of the disk caddy 1. With the disk caddy 1 thus released from the hook members 70, 70, the disk caddy 1 is ultimately introduced into the disk container 31.

In the foregoing description, a selected one of the disk caddies 1 housed within the left-hand one of the opposite disk containers when seen in FIG. 9 is extracted for playing on the disk 3 contained in the thus extracted disk caddy. In a similar manner, the selected one of disk caddies contained in the right-hand side disk container 31 when seen in FIG. 9 may be extracted for playing on the disk contained in the selected caddy. Thus the disk 3 may be placed on the disk table 41, the disk 3 is contained again in the caddy after termination of playing and the disk caddy is withdrawn into the disk container 31.

However, when the right-hand side disk container 31 is designated, the slider driving motor 64 is driven in reverse for shifting the slider 60 to the right-hand side disk container 31 as designated. When the pawls 72, 72 of the right-hand side hook members 70, 70 of the slider 60 reach the recesses 7, 7 of the disk caddy 1, the second switch 106 provided to the carrier 44 is acted upon by the second operating piece 105 on the right-hand side of one of the supporting rods 59 of the slider 60 when seen in FIG. 17 so that an output signal is issued indicating that the slider 60 has reached the second position close to the right-hand side disk container 31, thereby stopping the driving of the slider driving motor 64. The slider 60 is stopped at a position in which the hook members 70, 70 are facing to the recesses 7, 7 of the designated disk caddy 1. At this time, the solenoid plungers 79, 79 of the hook members 70, 70 positioned to the right-hand side of the slider 60 are turned off so that the pawls 72, 72 of these hook members are engaged in the recesses 7, 7 of the disk caddy 1. With the hook members 70, 70 thus holding the caddy case 1, the slider driving motor 64 is driven forwardly for shifting the slider towards the left-hand side disk container 31 or towards left in FIG. 17 for extracting the disk caddy 1 from the right-hand side container 31. The slider 60 is shifted to a first position or a center position between the disk containers 31, 31 in which the center aperture 3a of the disk 3 contained in the extracted caddy 1 is in register with the axis of the spindle 42 of the playing section, as shown in FIG. 18. With the slider 60 in the first position, the first operating piece 101 on the left-hand side of the supporting rod 59 of the slider 60 acts on the first switch 101 mounted on the carrier 44 so that an output signal is issued from the first switch. Thus the operation of the slider driving motor 64 ceases and the slider 60 is stopped at the first position.

Figure 17:
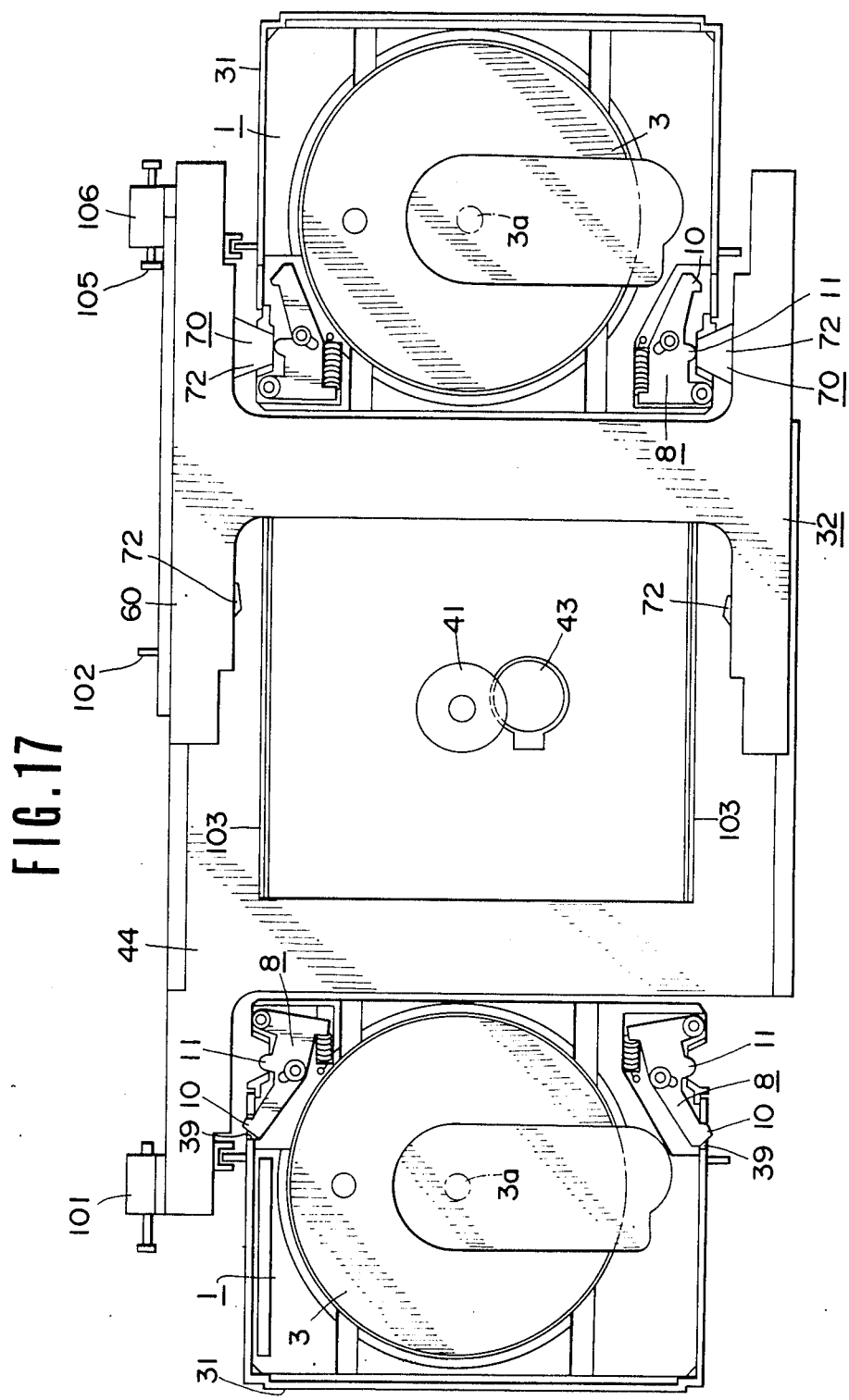
FIG. 17 is a plan view showing the slider in the second position.

When the slider 60 reaches the second position, the pawls 72, 72 of the left-hand side hook members 70, 70 are facing to the recesses 7, 7 of the disk caddy 1 contained in the left-hand side container 37, when seen in FIG. 17.

The slider 60 of the disk extracting unit 33 is in the form of a letter H symmetrical with respect to the central connecting web 58. The pairs of hook members 70, 70 are arranged close to each other symmetrically with respect to the centerline of the connecting rod 58. When the slider 60 is moved to the first position, the left-hand side hook members 70, 70 are ready to be engaged in the recesses 7, 7 of the disk caddy 1 contained in the left-hand side container 31, while the right-hand side hook members 70, 70 are engaged in the recesses 7, 7 of the caddy extracted from the right-hand side container 31 and the center aperture 3a of the disk 3 contained in the caddy 1 is at the center position between the disk containers 31, 31. When the slider 60 is moved to the second position, the right-hand side hook members 70, 70 are ready to be engaged in the recesses 7, 7 of the disk caddy 1 contained in the right-hand side disk container 31, while the left-hand side hook members 70, 70 are engaged in the recesses 7, 7 and the center aperture 3a of the optical disk 3 contained in the disk caddy extracted from the left-hand side container is at the center between the disk containers 31, 31. When the right-hand or left-hand side hook members are engaged in the recesses 7, 7 of the disk caddy 1 contained in one of the containers and the center aperture 3a of the disk 3 contained in the caddy 1 is at the center between the containers, the slider 60 is raised or lowered by the transfer unit 33. Thus the slider 60 may be reduced in size and the sliding extent thereof may also be reduced, while the disk containers 31, 31 may be placed at a smaller distance from each other, resulting in a more compact size of the device.

What is claimed is:

1. A device for exchanging disks for an optical disk player with a disk table and an optical pickup adjacent to the table, said device comprising a first disk container and a second disk container being mounted on opposite sides of the disk table of the player and in opposition to each other, each container having means for supporting disk caddies, each of said disk caddies having a disk support being profiled for mating with a disk placed flat therein, means for positioning the disk in said disk support, and having an opening large enough to pass the disk table and to permit movement of the optical pickup therethrough, said disk being removably carried by said disk caddy; a disk extracting unit including a moveable member with first and second means for releasably holding a disk caddy, said extracting unit being interposed between said first and second disk containers and above the disk table, said movable mamber of the unit being horizontally movable between a first position and a second position for extracting disk caddies contained in said disk containers and said unit with said member being vertically movable from a level of each of said first and second positions to a working position with said disk table engaging the disk in the caddy being held thereby, said first and second means each have a pair of hook members actuated by electromagnetic means when said disk extracting unit is in said first and second positions, and said first and second means being provided in said movable member in relation to each other and the distance between the first and second positions with the movable member in the first position having the hook member of the first means at a stand-by position capable of gripping opposite side edges of a disk caddy contained in said first disk container and the hook members of the second means being positioned to hold a caddy gripped thereby in a midposition vertically aligned over the disk table and with the movable member in the second position having the hook members of the second meams being in a stand-by position for gripping opposite side edges of a disk caddy in the second container and the hook member of the first means positioning a caddy held thereby in said midposition.

2. The device according to claim 1 wherein one of the first and second means of the extracting unit holds the disk caddy during the time that the disk caddy is extracted from the disk container, the disk carried by the caddy is detached from the caddy to be played and the disk is again contained in the caddy to be returned therewith into the disk container, whilst the other of said first and second means is at a stand-by position capable of holding another disk caddy.

3. The device according to claim 1 wherein a plurality of disk caddies are placed in tiers in said first and second disk containers.

4. The device according to claim 1 wherein said disk caddy has a disk supporting surface having substantially the same shape as the disk and means for positioning the disk on said surface.

5. The device according to claim 1 wherein said extracting unit is provided with means for sensing whether the first and second means of the extracting unit is holding a disk caddy.

6. A device according to claim 1, where each of the disk caddies has at least one lever mounted therein, means biasing the lever to an extended position with a latch portion projecting from a side face of the caddy, said first and second disk containers having means engaged by the catch portion when the lever is in the extended position and said hook members of each of said first and second means being operable to cause each lever of the caddy to move against the biasing means to disengage the catch portion from the disk container.

7. A device according to claim 6, wherein each caddy has a pair of levers, the means for supporting of each of said first and second disk containers have spaced vertical positions to receive a plurality of disk caddies in a vertical stack, said means engaged by the lever being apertured in opposite walls of each of said first and second disk containers with a pair of apertures for each of the vertical positions.

8. A device according to claim 1, wherein said disk extracting unit includes a frame, and drive means for shifting said movable member in the frame between the first and second positions.

9. A device according to claim 8, wherein said drive means includes a drive motor, a worm gear connected to the drive motor and engaged with a worm wheel and a spur gear driven by the worm wheel being mounted on one of said movable member and frame and a rack gear engaged by the spur gear mounted on the other of the frame and movable member.

10. A device according to claim 1, wherein said extracting unit includes a transfer means for supporting the unit for vertical movement and for vertically moving the unit to and from the operating position, said operating position having the disk table lifting the disk above the disk support of the caddy.

11. A device according to claim 1, wherein the means for supporting of each of the disk containers has a caddy support for each caddy stored therein, said caddy support having at least a pair of grooves extending parallel to the direction of movement between the first and second positions and each caddy on a lower surface having projections extending into the pair of grooves.

12. A device according to claim 1, wherein said extracting unit includes vertical transfer means for supporting the unit for vertical movement and for moving the unit vertically to and from the operating position.

* * * * *